Sept. 5, 1967  C. E. QUINN  3,339,676
BRAKE LINING WEAR INDICATOR BY SENSING
ADJUSTMENT LINK CONDITION
Filed June 21, 1965
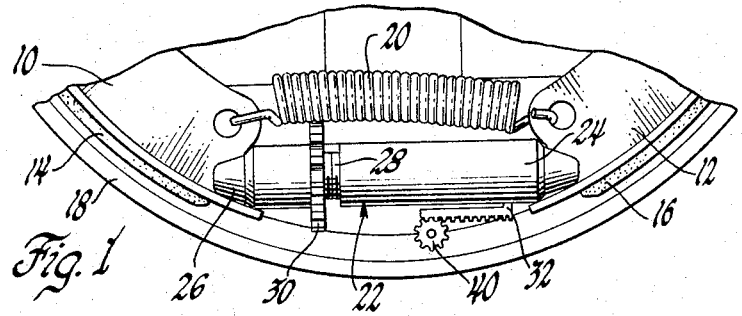
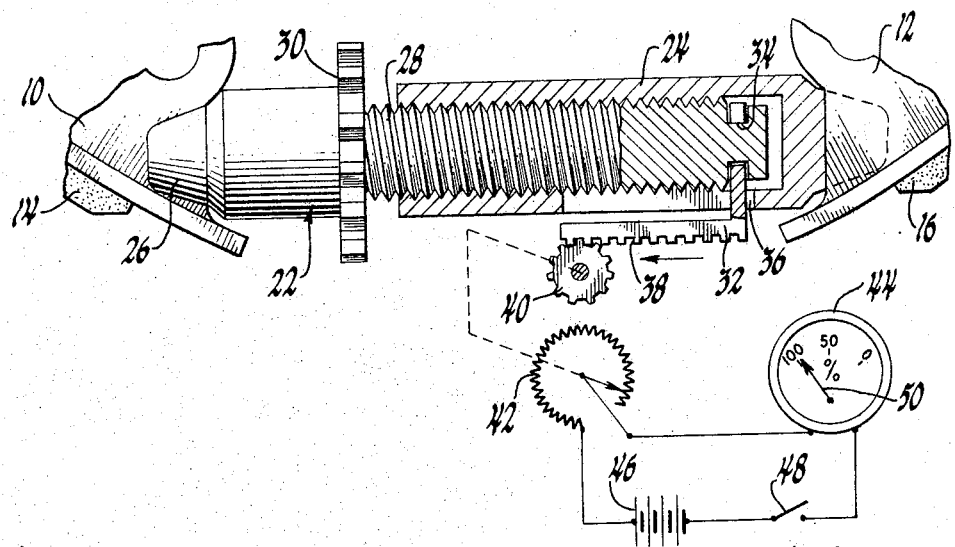
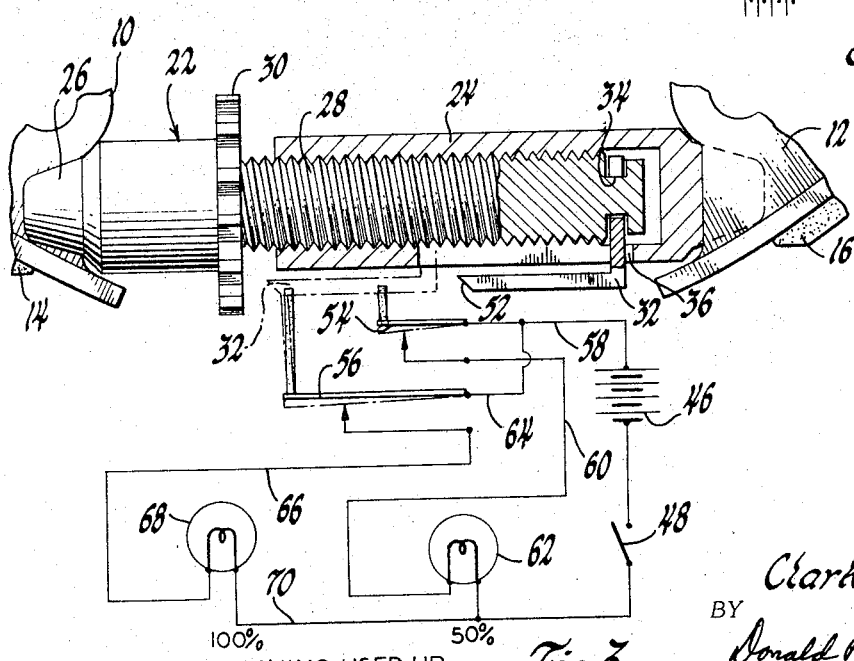
INVENTOR.
Clark E. Quinn
BY
Donald P. Selwecki
ATTORNEY

United States Patent Office 3,339,676
Patented Sept. 5, 1967

3,339,676
BRAKE LINING WEAR INDICATOR BY SENSING ADJUSTMENT LINK CONDITION
Clark E. Quinn, Rochester, Mich., assignor to General Motors Corporation, Detroit, Mich., a corporation of Delaware
Filed June 21, 1965, Ser. No. 465,498
6 Claims. (Cl. 188—1)

ABSTRACT OF THE DISCLOSURE

In a preferred form, this invention relates to an indicating system which responds to movement of an adjusting screw connected between the floating ends of a drum-type brake system to apprise a vehicle operator of the amount of brake lining wear that has occurred up to a given time. A leg is connected to the screw which activates an electrical indicating means.

---

This invention relates to braking mechanism and more particularly to apparatus adapted to measure the amount of brake lining wear as it occurs.

Utilizing brake mechanisms of common design, it is necessary to remove a vehicle wheel in order to ascertain the amount of brake lining wear having been experienced to that time. A vehicle wheel and brake drum are portions of the vehicle requiring very little maintenance and, consequently, long time periods normally ensue between the times that the linings become visible during normal maintenance. In addition, widespread use of automatic brake adjusters makes it unnecessary to manually adjust the clearance between brake linings and the brake drum. The combination of these factors very often allows the brake linings to become well worn before a vehicle operator is apprised of a heavily worn brake lining.

It is an object of the present invention to provide an improved brake lining wear measuring device that is responsive to movement of brake shoes toward a drum as they are adjusted.

It is another object of the present invention to provide an improved brake lining wear measuring device utilizing a gear driven rheostat calibrated to the thickness of the brake lining that is responsive to brake shoe movement to a new poised position relative to a drum to visually indicate the amount of lining remaining on a brake shoe.

It is still another object of the present invention to provide an improved brake lining wear measuring device responsive to movement of a brake adjuster to mechanically operate a switch adapted to energize lights indicating a degree of brake lining wear.

Further objects and advantages of the present invention will be apparent from the following description, reference being had to the accompanying drawings wherein preferred embodiments of the present invention are clearly shown.

In the drawings:

FIGURE 1 is a partial elevational view of a brake adjuster showing one embodiment of the present invention in its operative environment;

FIGURE 2 is a diagrammatic illustration of electrical apparatus associated with the embodiment of FIGURE 1;

FIGURE 3 is a diagrammatic illustration of electrical apparatus associated with another embodiment of the present invention.

Referring to FIGURE 1, brake shoes 10 and 12 carrying linings 14 and 16, respectively, are illustrated as poised a predetermined distance away from a rotatable drum 18. A spring 20 engaging shoes 10 and 12 maintains brake adjuster 22 in its operative position between opposed ends of shoes 10 and 12.

Referring to FIGURE 2, a threaded sleeve 24 engages a web of shoe 12 and is non-rotatable with respect thereto. A non-threaded sleeve 26 engages the web of shoe 10 and is non-rotatable with respect thereto. Screw 28 has a threaded portion cooperating with threaded sleeve 24 and another portion freely rotatable in non-threaded sleeve 26. Star wheel 30 integrally formed with screw 28 is actuatable in any well-known fashion, for example, manually or by an output arm of a typical automatic brake adjuster, to move screw 28 relative to sleeve 24. Therefore, adjuster 22 is an expandable device that is adapted to maintain a predetermined poised position of shoes 10 and 12 relative to drum 18. Spring 20 serves to maintain pressure of shoes 10 and 12 against sleeves 26 and 24, thereby maintaining adjuster 22 in its operative position.

A leg 32 peripherally engages screw 28 in slot 34 and is rotatable with respect to screw 28 and vice versa. Slot 36 is elongated in a wall of sleeve 24 parallel to the longitudinal axis of sleeve 24. In the embodiment shown in FIGURE 2, leg 32 has a rack portion 38 cooperating with a gear 40 arranged to drive rheostat 42. Rheostat 42 is synchronized with gauge 44 providing a visual indication of the amount of resistance change in rheostat 42. Full deflection in rheostat 42 is calibrated through gear 40 and rack 38 to the thickness of linings 14 and 16.

An electrical circuit is provided with battery 46 supplying current to gauge 44 through rheostat 42 in series therewith, controlled by switch 48 which may be the ignition switch of a vehicle.

In operation, as brake lining wear occurs, star wheel 30 is either manually or automatically adjusted by being turned, thereby maintaining linings 14 and 16 a predetermined poised distance away from drum 18. As star wheel 30 is turned, screw 28 extends further from sleeve 24. Leg 32 carried by screw 28 follows movement of the screw and moves in slot 36. Rack 38 formed in leg 32 moves linearly and turns gear 40, in turn rotating rheostat 42. Rheostat 42 is calibrated to gauge 44 and causes a deflection of needle 50 thereof. This occurs, of course, when switch 48 is closed providing a path for current flow from battery 46. In this manner, the movement of adjusting screw 28 is related to a deflection of needle 50 in any well-known manner and this movement is calibrated to brake lining wear providing a visual indication thereof.

Another embodiment of the present invention is illustrated in FIGURE 3 utilizing the same principle shown in FIGURE 2 but with slightly different structure. In this embodiment, leg 32 has a beveled end 52 adapted to trip deflectable switch actuators 54 and 56 to energize associated electrical apparatus. In this embodiment, battery 46 controlled through switch 48 supplies electrical power to lever actuator 54 through lead 58 with lead 60 completing a circuit through light 62 to switch 48. Another path for current flow exists from battery 46 through lead 58 and lead 64 to deflectable switch actuator 56. Lead 66 provides a path for current flow through light 68 connected through switch 48 to battery 46 by lead 70.

In operation, star wheel 30 functions in the same manner as in the previously described embodiment and causes the rotation of screw 28 relative to sleeve 24 when take-up of brake shoes 10 and 12 is necessitated. Again, as in the previous embodiment, this take-up can be accomplished manually or automatically in a given installation. As screw 28 is threaded from sleeve 24, leg 32 moves linearly in slot 36 and eventually deflects actuator 54 and actuator 56. It is understood that actuators 54 and 56, in the example shown, indicate 50% and 100% of lining usage. Any number of actuators could be used to indicate different increments of brake lining usage and this choice is left to the designer of the system. As circuits are progressively energized, the corresponding lights 62 or 68 will become incandescent, alerting the vehicle operator to a given increment of brake lining wear. It is understood that the spacing of actuators 54 and 56 relative to the leading edge of leg 32 provides the calibration between the wear of linings 14 and 16 and lamps 62 and 68. The exact calibration and the exact increment indicated is easily designed for a given installation depending on lining thickness and the desired poised position of the linings relative to the drum.

The subject invention demonstrates particular utility in the conventional type band brake illustrated herein but it is understood that it is adaptable for use with an automatic adjuster for this type of brake as well as being adapted for use in following disc wear on disc braking mechanisms. The basic requirement is that an element be movable proportionately to the movement of an adjusted brake lining and this movement be calibrated to associated electrical apparatus, such as that illustrated in FIGURES 2 or 3. The simplicity of the system both electrically and mechanically extends the utility of the subject device to vehicles having conventional brakes in that the installation is extremely inexpensive and susceptible to few maintenance requirements.

While the embodiments of the present invention, as herein disclosed, constitute preferred forms, it is to be understood that other forms might be adopted.

What is claimed is as follows:

1. A brake lining wear measuring device comprising: an expandable sleeve and screw arrangement operatively disposed between opposite ends of brake shoes, said screw movable relative to said sleeve in response to a force exerted on said screw to take up the variance between the brake shoes as lining wear occurs thereon after repeated brake actuations; a leg carried by said screw and arranged to move linearly therewith as said screw is turned; and electrical means carried in fixed relationship with respect to said sleeve and screw and engageable by said leg to indicate a progressively moving screw and to convert this mechanical movement into an electrically induced visual indication of brake lining wear.

2. A brake lining wear measuring device according to claim 1 wherein said leg includes a rack portion integrally formed therewith and said electrical means includes a gear driving a rheostat and cooperating with said rack to be responsive to progressive brake lining wear.

3. A brake lining wear measuring device according to claim 1 wherein said leg mechanically and sequentially drives movable conductive means in engagement with fixed conductive means to create an electrical connection to visual indicators showing an amount of brake wear experienced up to a given time.

4. A brake lining wear measuring device comprising: a threaded sleeve carried in non-rotatable relationship with respect to a first brake shoe and having a slot therein along a wall thereof parallel to the longitudinal axis of said sleeve, a plain sleeve carried in non-rotatable relationship with respect to a second brake shoe oppositely disposed from said first brake shoe, said first and second brake shoes being positioned a predetermined distance from a brake drum; a screw member having a threaded portion cooperating with said threaded sleeve and movable with respect thereto as lining wear and said first and second brake shoes are positioned nearer the brake drum, said screw member have a non-threaded pilot portion rotatably carried by said plain sleeve; a leg rotatably carried by said screw and arranged to move linearly in the slot in said threaded sleeve as said screw is turned during lining wear thereby maintaining said threaded sleeve and said plain sleeve in contact with said first and second brake shoes respectively; and electrical means responsive to linear movement of said leg to provide a visual indication of the amount of brake lining wear.

5. A brake lining wear measuring device according to claim 4 wherein said electrical means includes a gear driven rheostat driven by said leg and a gauge synchronized with said rheostat and said linearly moving leg to indicate an amount of lining wear.

6. A brake lining wear measuring device according to claim 4 wherein said electrical means includes a plurality of lever actuated switches proportioned apart a distance corresponding to increments of lining wear and indicating means energized by said switches.

References Cited

UNITED STATES PATENTS

| | | |
|---|---|---|
| 2,002,139 | 5/1935 | Des Rosiers. |
| 2,078,703 | 4/1937 | Wisniewsk. |
| 2,087,386 | 7/1937 | Norton. |
| 3,088,549 | 5/1963 | Borsa _____ 188—1 |

DUANE A. REGER, *Primary Examiner.*